United States Patent [19]

Jahnle

[11] 4,428,599
[45] Jan. 31, 1984

[54] FRONT AND REAR ENERGY ABSORBING STRUCTURES FOR A FOUR PASSENGER VEHICLE

[75] Inventor: Herbert A. Jahnle, Havertown, Pa.

[73] Assignee: The Budd Company, Troy, Mich.

[21] Appl. No.: 344,731

[22] Filed: Feb. 1, 1982

[51] Int. Cl.³ .............................................. B62D 21/00
[52] U.S. Cl. ................................. 280/784; 296/185;
  296/203; 296/204; 293/132
[58] Field of Search ............... 280/784, 785, 795–800,
  280/781; 193/132; 296/185, 203, 205, 204

[56] References Cited

U.S. PATENT DOCUMENTS

| | | | |
|---|---|---|---|
| 3,831,997 | 8/1974 | Myers | 293/133 |
| 4,133,549 | 1/1979 | Reidelbach et al. | 280/784 |
| 4,355,844 | 10/1982 | Muzzarelli | 280/784 |

Primary Examiner—Robert R. Song
Attorney, Agent, or Firm—Edward M. Farrell; Herman Foster; Thomas I. Davenport

[57] ABSTRACT

A four passenger automobile frame includes a main platform and an open frame secured thereto for receiving panels thereon. Energy absorbing means are included in pairs of forwardly and rearwardly extending side rails which are connected from the platform to front and rear bumpers.

3 Claims, 4 Drawing Figures

FRONT AND REAR ENERGY ABSORBING STRUCTURES FOR A FOUR PASSENGER VEHICLE

BACKGROUND OF THE INVENTION

Platforms providing the main underframes for automobiles have been disclosed in a U.S. Pat. No. 3,423,123 to H. W. Wessels III. Such platforms provide a rigid base to which the upper frame members of the automobile may be attached. Generally, such platforms have included floor areas, a firewall and pairs of forwardly and rearwardly extending side rails having front and rear bumpers connected thereto.

An advantage in using a platform and an open upper frame attached thereto is that the basic strength for the automobile is provided in the structure. The various external panels mounted to the open frame may be considered as dust panels which may be made of any type of material to accommodate costs, manufacturing, corrosive resistance, appearance, weight and other factors.

While the structures involving the platform and open frame may generally be designed to provide sufficient stiffness, crash worthiness must also be considered. The crash worthiness must take into account the safety of the passengers, the location of the fuel tank and other factors.

In designing a relatively small four passenger automobile, special consideration must be given to protect the fuel tank from impacts. Also, because such an automobile is designed for two passengers in the front and two in the rear, consideration to both front and rear collisions must be given with due regard to the safety of the passengers as well as the location of the fuel tank.

Energy absorbing devices have taken a wide variety of forms in automobiles. In general, such devices have been connected to the front bumpers to absorb impacts to minimize damage to the main body of the automobile as well as providing protection for the passengers.

OBJECTS OF THE INVENTION

It is an object of this invention to provide an improved four passenger vehicle frame wherein front and rear end collision protection is provided for passengers riding in both the front and rear passenger areas of the vehicle.

It is a further object of this invention to provide an improved four passenger vehicle frame in which improved energy absorbing means are employed in both the front and rear sections of the vehicle to protect the passengers and gas tank from front and rear collisions.

BRIEF SUMMARY OF THE INVENTION

In accordance with the present invention, a four passenger vehicle frame includes a platform and an open frame secured thereto to receive panels thereon. A pair of forwardly extending side rails including energy absorbing means are connected between the front bumper and firewall of the vehicle. A pair of rearwardly extending side rails including energy absorbing means are connected between the rear bumper and a bulkhead which is designed to protect the gas tank. Floor areas for the passengers are included in the platform on opposite sides of the bulkhead.

Other objects and advantages of the present invention will be apparent and suggest themselves to those skilled in the art, from a reading of the following specification and claims, taken in conjunction with the accompanying drawings.

DETAILED DESCRIPTION OF THE PREFERRED EMBODIMENTS

Figure 1:
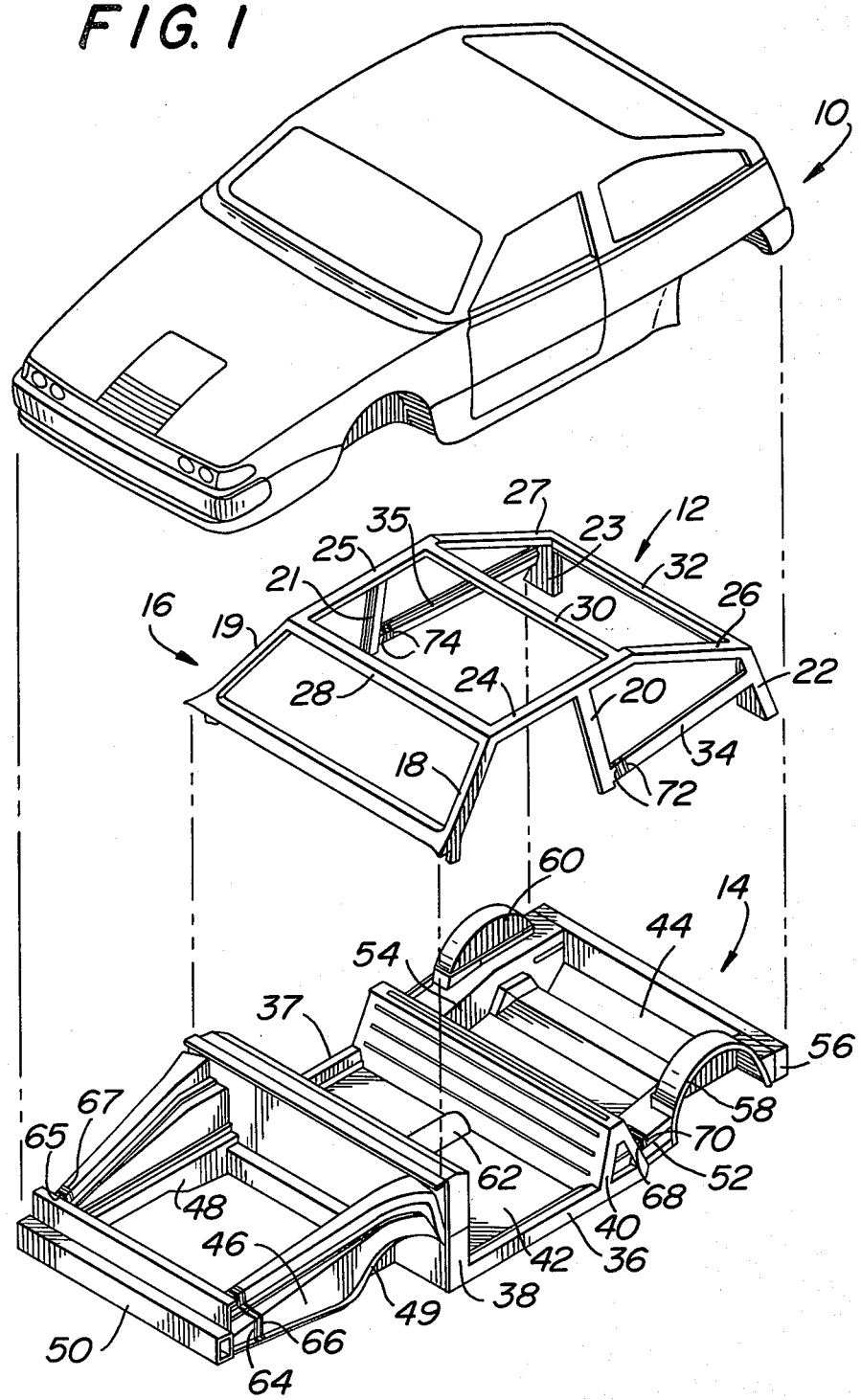
FIG. 1 is an exploded view illustrating a main panel assembly, an open upper frame and a platform underframe of an automobile, in accordance with the present invention.

Referring to FIG. 1, a panel assembly 10 makes up the external appearance of a four passenger vehicle. The panels in the assembly may include the usual panels used in conventional automobiles. Because the external panels are not directly related to the present invention, they will not be described or referred to separately. The main support structure with which the panel assembly 10 may be used and which involves the present invention comprises an open frame 12 and a platform 14.

The upper frame 12 may be considered as a space frame or a cage of steel or other metals where all the elements making up the basic structure above the floor level of the automobile would be just a space of a particular material on which the panels, such as those illustrated in the panel assembly 10, may be attached. The strength and stiffness of the vehicle involved are obtained primarily by the open frame 12 and the platform floor 14. When the upper frame 12 is attached to the platform 14 by suitable welding, the main support structure for the vehicle involved is formed. A number of different designs involving different types of outer skin panels may now be attached to the basic frame.

The upper frame 12 and the platform 14 may be made out of aluminum alloys. The panel assembly 10 may be made out of a combination of sheet molding compound, polycarbonate, or the like. Glass would be used for the windshield glazing. The use of aluminum in the upper frame 12 and platform 14 provides a relatively light weight frame. At the same time, the upper side frame attached to the underbody platform frame provides more stiffness and strength in the vehicle.

Figure 2:
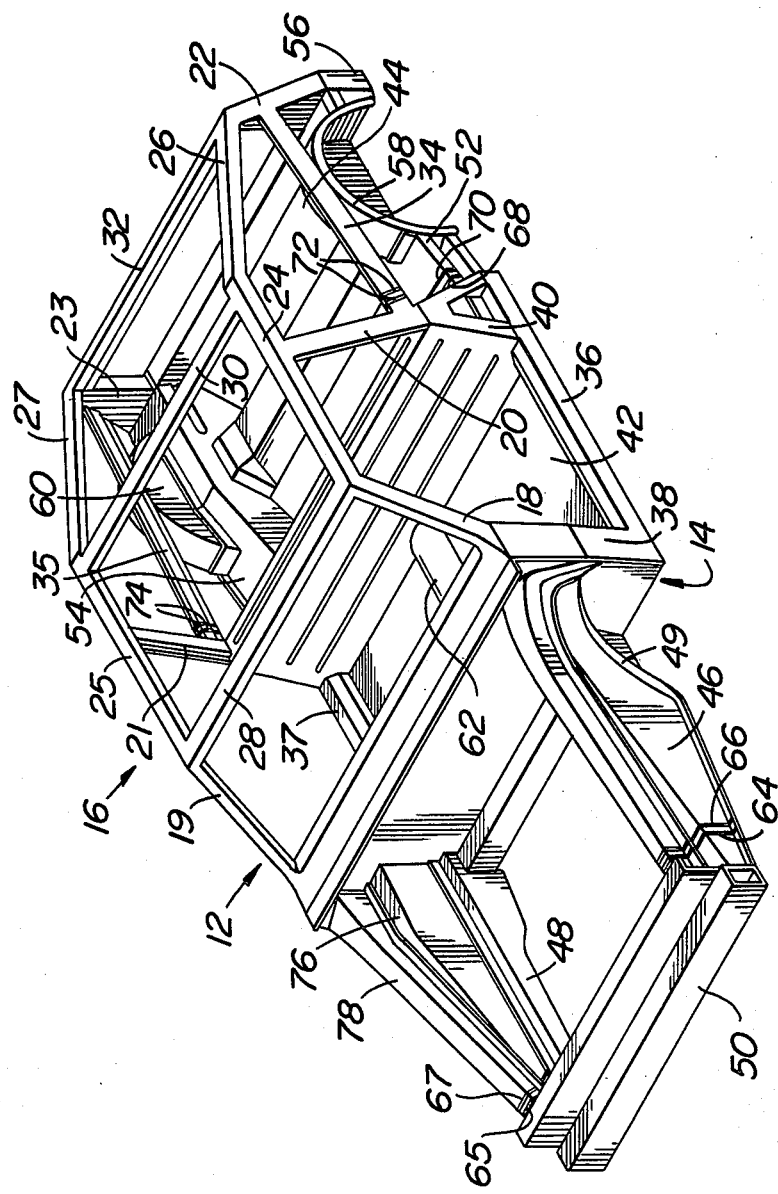
FIG. 2 is an isometric view of the main support structure of the automobile which includes the open frame secured to the platform underframe.

FIG. 2 illustrates the main vehicle support structure 16 assembled in which the upper frame 12 is secured to the bottom platform structure 14. The upper frame 12 comprises upper A posts 18 and 19, B posts 20 and 21, and rear vertical structures 22 and 23. Two roof side rails 24 and 25 and angular rails 26 and 27 join the various posts.

A pair of roof head beams 28 and 30 are connected between the roof side rails 24. A rear door cross member 32 is connected between the rear vertical structures 22 and 23. Rear belt lines 34 and 35 are connected between B posts 20 and 21 and rear vertical structures 22 and 23. The rear belt line elements or rails are disposed substantially parallel to the rear rails 52 and 54. Side sills 36 and 37 are connected between a firewall structure 38 and a fuel bulkhead structure 40.

The platform 14 includes a front floor area 42 and a rear floor area 44. The floor area 42 provides room for two passengers in the front seat (not illustrated) of the vehicle. The rear floor area 44 provides passenger room for two passengers in the rear seat (not illustrated) of the vehicle. The floor area 42 is between the firewall 38 and the bulkhead 40. The floor area 44 is between the rear of the vehicle and the bulkhead 40.

A pair of forwardly extending side rails 46 and 48 are connected to and extend forwardly from the firewall 38. Wheel well structures are provided in the side rails 46 and 48, with only the structure 49 being illustrated. A front bumper 50 is connected between the forwardly extending ends of the side rails 46 and 48. A pair of rearwardly extending side rails 52 and 54 are connected to and extend rearwardly from the bulkhead 40. A rear bumper 56 is connected to the ends of the side rails. Wheel well assembly structures 58 and 60 are connected to the rear side rails 52 and 54 between the bulkhead 40 and the rear bumper 56.

The engine for the automobile (not illustrated) may be placed in the area between the forwardly extending side rails 46 and 48, between the bumper 50 and the firewall 38. The gas tank (not illustrated) may be disposed within the bulkhead 40. Various mechanisms for driving the rear wheels of the vehicle from the engine may be fed through a tunnel 62 within the floor area 42 of the platform 14. Many components found in conventional automobiles are not shown because they are well known and only indirectly related to the present invention. For example, means for mounting the various front and back seats are well known. In the particular vehicle illustrated, the passengers in the rear of the vehicle over the floor space 44 would face rearwardly with their feet at the bumper. They would be generally seated on seats disposed close to the bulkhead 40.

In addition to providing a basically strong frame structure which permits a wide variety of different types of design on the external panelling, the present invention is directed toward providing a vehicle which is capable of absorbing all the kinetic energy of a vehicle moving at a predetermined speed against a barrier before the barrier itself is hit. For example, the vehicle involved would be capable of withstanding a forward or frontal impact into a stationary barrier at approximately 35 m.p.h. In the rear of the vehicle, the vehicle was designed to withstand rear impacts with a vehicle moving at 30 m.p.h. These objectives were accomplished without any fuel leakage out of the gas tank protected by the bulkhead 40 or seriously injuring the passengers in the front or rear seats. The rear end test in many cases is considered more important because of the fuel leakage that may result from high impacts. In order to provide more passenger protection and the prevention of fuel leakage, the present invention has provided an energy absorption system to withstand frontal and rear impacts.

The energy absorption for frontal impact is provided by energy absorbing means incorporated in the forwardly extending side rails 46 and 48. The energy absorbing means includes indentations or deformations 64 and 66 in the side rail 46. In like manner, the side rail 48 includes deformations 65 and 67. The deformations in the side rails 46 and 48 are in close proximity to the bumper 50. As will be described in connection with FIG. 3, the side rails 46 and 48 each include three pieces for added strength, with each of the three pieces including similar deformations, which may be considered as creases or failures in the column which are extended around the portions of the side rails being crushed. As illustrated, the side rails 46 and 48 extend horizontally in essentially straight lines from the front of the vehicle where it is connected to the bumper 50 back to the fire wall 38. The straight line arrangement prevents bending away from the structure when the vehicle strikes a barrier and permits an orderly collapse of the structure as the energy is absorbed when striking the barrier. In order to make certain that there are no initial high peak loads when the barrier is struck by the vehicle and to fix the areas at which the collapses should start, the deformations, indentations or dimples are designed in the side rails 46 and 48 in the manner illustrated.

In like manner, the rear side rail 52 also includes indentations 68 and 70 which eliminate high initial peak loads and determine the area at which the energy absorbing means starts to become effective. The rear side rail 54 includes indentations 69 and 71 which operate in a similar manner. The rear side rails 52 and 54 are connected between the rear bumper 56 and the bulkhead 40. The collapse mechanism or operation in the rear end of the car is controlled to allow most of the collapse between the wheel wells 58 and 60 and the fuel tank bulkhead 40. It is desirable to have the vehicle collapse near the rear end upon rear impact and back of the passengers who are facing rearwardly with their feet toward the bumper 56. Upon rear impact, the initial collapse takes place between the wheel wells 58, 60 and the bulkhead 40. The collapse in the rear rail 52 is triggered by the deformations or indentations 68 and 70. The collapse of the rear rail 54 is triggered by the deformations 69 and 71. The straight line arrangement of the side rails 52 and 54 provide an orderly collapse of the structures during a rear collision. The collapsing of either the front or rear side rails causes energy to be absorbed in the structures. The indentations, by providing the locations to trigger the starts of the collapses and cause collapses to occur early in a collision. Critical pairs of indentations 72 and 74 are included in the rear belt line rails 34 and 35, respectively, to further cause collapse to occur early in a collision during rear impact. The indentations 72 and 74 are in substantial vertical alignment with the indentations in the rear rails 52 and 54, respectively.

Figure 4:
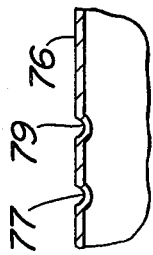
FIG. 4 is a cross-sectional view taken along lines 4—4 of FIG. 3.

FIG. 4 illustrates a straight line portion of a channel structure 76 with indentations 77 and 79 therein. The indentations are essentially creases or failures in the column making up the structure 76. These indentations are extended around the column 76 to weaken it.

Figure 3:
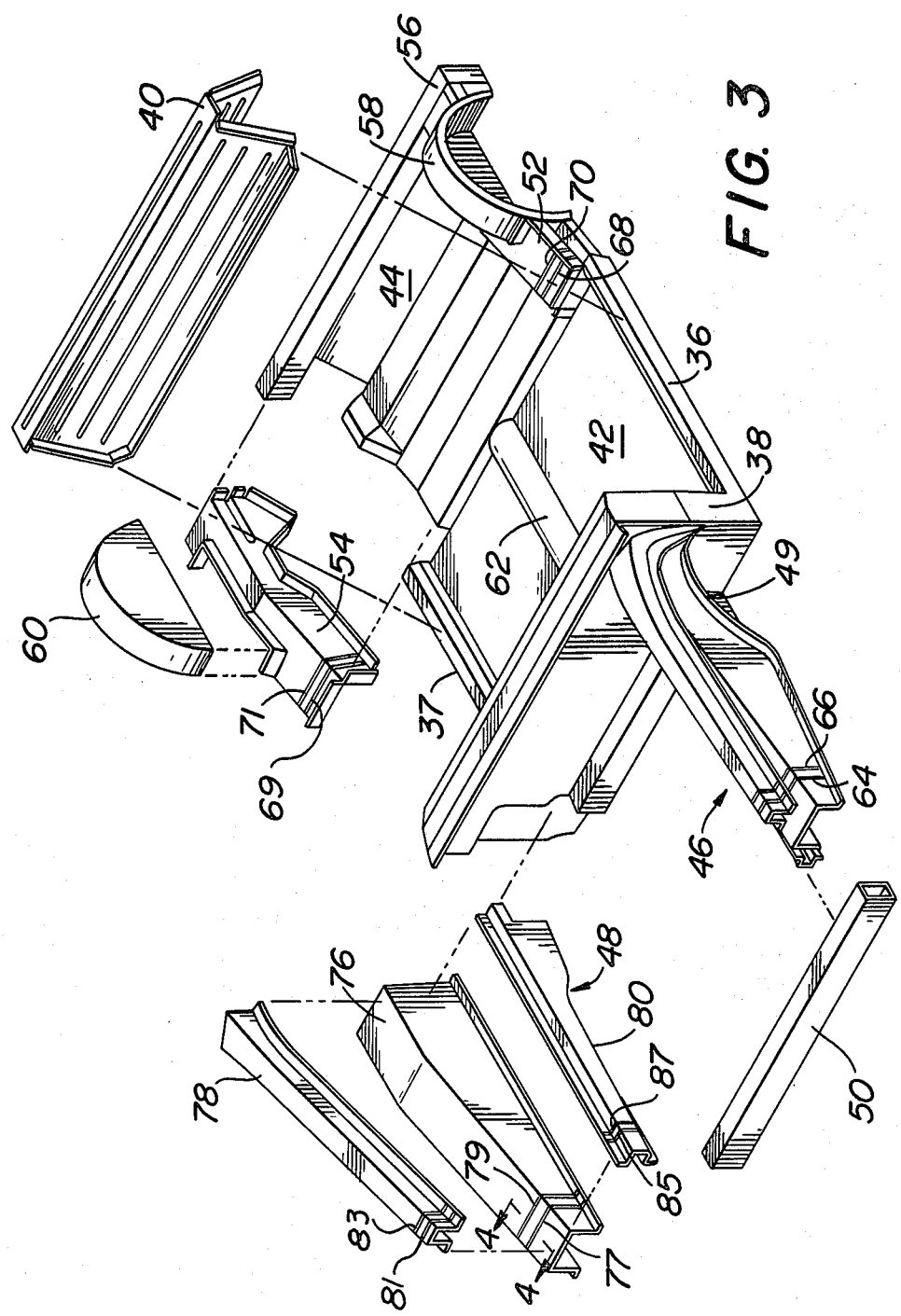
FIG. 3 is an exploded view illustrating parts of the platform structure of FIG. 2.

As illustrated in FIG. 3, the forwardly extending side rail 48 comprises the main channel 76 with indentations 77 and 79, a top channel 78 with indentations 81 and 83 and a side channel 80 with indentations 85 and 87. Side rail 46 includes elements similar to rail 48. Multiple pieces are used for added strength. The indentations 77, 81 and 85 make up the deformation 65 (FIG. 2). Indentations 79, 83 and 87 make up the deformation 67 (FIG. 2). Single reference numerals 65 and 67 were used for three pieces for purposes of explanation in FIG. 2. It is noted that the indentations involved in the three channel pieces 76, 78 and 80 extend from one edge of their respective channels to the other edge.

The rearwardly extending side rails 52 and 54 include indentations 68, 70 and 69, 71, respectively, also extend from one edge of the respective side rails to the opposite edge. These side rails 52 and 54 are "L" shaped and formed to accommodate the wheel wells 58 and 60.

What is claimed is:

1. A four passenger automobile comprising:

(a) a main platform including front and rear passenger compartments, a fire wall, and a bulkhead disposed between said front and rear floor areas;
(b) an open frame secured to said platform to receive panels thereon;
(c) a pair of front side rails extending from said firewall;
(d) a front bumper secured to said front side frames;
(e) said front side rails having front indentations therein in the areas in close proximity to said bumpers;
(f) a pair of rear side rails extending from said bulkhead;
(g) a rear bumper secured to said rear side rails;
(h) said rear side rails having rear indentations therein in the areas in close proximity to said bulkhead;
(i) wheel well structures secured to said rear side rails between said bulkhead and said rear bumper with said rear indentations being disposed between said wheel well structures and said bulkhead;
(j) said pair of front side rails including front wheel well structures disposed between said front indentations and side firewall;
(k) said front and rear side rails extending substantially horizontally in straight lines from the front and rear of the automobile to cause orderly collapses of said side rails as energy is absorbed during front or rear impacts; and
(l) said open frame including a pair of rear belt line elements spaced over said rear rails in parallel relationship therewith with said rear belt line elements each including indentations therein in substantial vertical alignments with indentations in said rear rails.

2. A four passenger automobile as set forth in claim 1 wherein a panel assembly is attached to said open frame.

3. A four passenger automobile as set forth in claim 2 wherein an open area is provided to receive an engine between said front side rails, said front bumper and said firewall.

* * * * *